United States Patent [19]

Yu

[11] Patent Number: 4,791,189
[45] Date of Patent: Dec. 13, 1988

[54] TERMINALLY UNSATURATED MACROMOLECULAR MONOMERS OF POLYLACTONES AND COPOLYMERS THEREOF

[75] Inventor: Simon H. Yu, Westlake, Ohio

[73] Assignee: The B. F. Goodrich Company, Akron, Ohio

[21] Appl. No.: 46,818

[22] Filed: May 7, 1987

[51] Int. Cl.$^4$ .................... C08G 63/08; C08G 63/10
[52] U.S. Cl. .................... 528/355; 525/408; 528/354
[58] Field of Search ............. 525/408; 528/354, 355

[56] References Cited

U.S. PATENT DOCUMENTS

| | | | |
|---|---|---|---|
| 3,654,347 | 4/1972 | Kincaid | 528/75 X |
| 3,655,631 | 4/1972 | Fraser et al. | 528/355 X |
| 3,767,627 | 10/1973 | Schoen | 528/354 X |
| 4,281,172 | 7/1981 | Knopf | 528/354 X |
| 4,368,320 | 1/1983 | Aldinger et al. | 528/354 X |
| 4,504,635 | 3/1985 | Weber et al. | 528/354 X |
| 4,632,975 | 12/1986 | Cornell et al. | 528/354 |
| 4,683,287 | 7/1987 | Koleske et al. | 528/354 X |

Primary Examiner—Earl Nielsen
Attorney, Agent, or Firm—Alan A. Csontos; Alfred D. Lobo

[57] ABSTRACT

Preparation of a macromolecular monomer of a lactone allows the preparation of copolymers of lactones with commonly available olefinically unsaturated monomers. There is no known method for the preparation of such copolymers. A cationic ring-opening polymerization of a lactone in conjunction with an unsaturated alcohol (propagator) having an acryloyl, allyl or styryl double bond, produces a polylactone macromer having an ethylenic double bond at one end and a hydroxyl group at the other. The polymerization proceeds by polyaddition of the lactone to the OH group which is the propagating species. The polylactone may include a polymeric or non-polymeric spacer. The propagator is a primary or secondary alcohol which, if cyclic may have a single internal double bond in one ring. The catalyst is an oxonium salt, or etherate of boron trifluoride. The macromer may be copolymerized with a wide variety of olefinically unsaturated monomers to form a macromer copolymer with pendant polylactone chains. In particular, block copolymers of terminally unsaturated macromers of ether-ester, or ester-ether structure may be tailored for specific applications.

7 Claims, No Drawings

TERMINALLY UNSATURATED MACROMOLECULAR MONOMERS OF POLYLACTONES AND COPOLYMERS THEREOF

BACKGROUND OF THE INVENTION

This invention relates to macromolecular monomers ("macromers" for brevity) of polylactones having a styryl, allyl, or acryloyl "head" (individually and collectively referred to herein as "vinyl functional") group at one end, and a terminal hydroxyl (OH) group at the other end. The polylactone macromer may also be used to initiate block copolymerization with a ring-openable ether or with another lactone monomer to form a new macromer of block copolymer of lactone-ether or lactone-lactone, respectively. The polylactone macromer is copolymerizable through its head group with an olefinically unsaturated copolymerizable monomer. The copolymerization of the macromer with one or more conventional olefinic monomers generates a "polymacromer" with a saturated hydrocarbon backbone having polylactone branches thus resulting in a graft or comb copolymer. Such copolymerization of the macromer of this invention, to form comb copolymers, differs from graft copolymerization in the sequence of formation of the backbone relative to the formation of the graft unit.

Normally, lactones are not copolymerizable with commonly available olefinically unsaturated monomers. The macromers of this invention now makes this possible.

The macromer is formed in commercially acceptable yield by the cationic ring-opening polymerization of a lactone in conjunction with (a) an alkenyl alcohol which functions as the generator of the propagating species, and (b) an oxonium salt, or etherate of boron trifluoride, cationic ring-opening catalyst. The alkenyl alcohol (referred to as the "propagator", because it functions as the 'propagating species (OH group) generator' in the presence of a cationic initiator), if substituted, may have substituents which do not interfere with the initiation, propagation and transfer reactions which generate the macromer in a polymerization which has the characteristics of a living polymerization.

U.S. Pat. No. 3,655,631 to Fraser, teaches that lactones are polymerized in the presence of strong organic acids such as halogen activated carboxylic acids or sulfonic acids as catalyst, and a compound having the formula L—CH$_2$OH as initiator, wherein L contains ethylenic unsaturation activated by amide or ester linkages, the ethylenic unsaturation being either CH$_2$=CH< or CH$_2$=CH—, but only an acrylic group was exemplified. The resulting terminally unsaturated polylactones were copolymerized with an ethylenically unsaturated monomer, for example, vinyl acetate; and, were used as plasticizer for poly(vinyl chloride) (PVC). But the teaching as to any ethylenically unsaturated group is not as broadly applicable as at first appears. For example, when the ethylenically unsaturated group is a vinyl ether group, the alkenyl alcohol, such as 2-hydroxyether vinyl ether (CH$_2$=CH—O—CH$_2$—CH$_2$OH) or 4-hydroxybutyl vinyl ether, is an ineffective propagator. The vinyl ether group of the alkenyl alcohol does not survive under the conditions of cationic ring-opening polymerization of lactones and undergo carbocationic polymerization. As a result, the lactone polymers do not have an ethylenically unsaturated head group.

Further, since Fraser was unaware that the OH group could function as the propagating species, he attributed his polymerization to the ester or amide linkage of the alcohol. Thus, the possibility of using the polylactone polymer he made, to initiate a block polymerization with another lactone could not have occurred to him. Still further, it is only because it is now known that the same lactone ring-opening catalysts are effective in the ring-opening polymerization of alkylene oxides, was it possible to arrive at the concept of using an —OH terminated polylactone with an ethylenically unsaturated head group, as the propagator for the formation of a block copolymer.

It should be recognized that, in copending patent applications Ser. Nos. 771,093 and 796,634, I have obtained allyl terminated, and styryl terminated macromers of polyethers by the cationic ring-opening polymerization of ethers using allyl alcohol and styryl alcohol, respectively, as the propagators, in a reaction involving the cationic ring-opening of an ether. However, there was little reason to assume the reaction would be effective in the polymerization of lactones which are esters, or to predict what properties copolymerization of vinyl-functional polylactone macromers might contribute to copolymers formed with them. Nor was there any reason to believe that the carboxylic acid or sulphonic acid catalysts taught by Fraser could be replaced with an oxonium salt or the etherate of boron trifluoride.

It is known that oxonium salts are effective in ring-opening polymerization of oxirane compounds (see U.S. Pat. No. Re. 31,577 to Riew); and that a hydroxyalkylacrylate provides a vinyl functional head group in such a polymerization (see U.S. Pat. No. Re. 31,468). It so happens that triethyloxonium hexachloroantimonate and triethyloxonium tetrafluoroborate are known to be effective in the polymerization of lactones (see "Catalytic Polymerization of epsilon-caprolactone" by Burba, C et al Ger. Offen. DE No. 2123968) but not for providing an unsaturated head group. Since it is critically important that my macromer possess the vinyl head group, the possibility of using an oxonium salt or the etherate of boron trifluoride in conjunction with the vinyl functional propagator was given little weight. Also, it is well known that, because the mechanisms are generally different, an effective catalyst for cationic ring-opening an oxirane to form a polyether, is not likely to be effective for ring-opening a lactone to form a polyester, and vice versa. It was simply the availability of the particular catalysts which instigated the investigation of their activity in conjunction with a vinyl functional propagator which initiated the ring-opening polymerization of lactones, and such activity fortuitously was found to be high.

It is to be noted that the macromers of this invention are formed by cationic ring-opening and not carbocationic polymerization, though both are classified as cationic polymerizations and may even use the same cationic initiator. The cationic ring-opening involves the opening of strained rings of cyclic monomers and the propagating species is an oxonium, sulfonium or ammonium ion; carbocationic polymerization involves substituted olefinic monomers where the propagating species is a carbenium ion.

With the emphasis on the essentiality of the OH propagating sites and the routine use of saturated end groups, the possibility that a vinyl group, and more specifically, an acryloyl, allyl, or styryl end group might survive the conditions of cationic ring-opening polymerization simply escaped noticed. In view of the large number of olefinically unsaturated monomers which undergo polymerization (see the list in *Carbocationic Polymerization* by Kennedy, J. P. and Marechal, E., Table 3.6, pp 37 et seq., John Wiley & Sons 1982) the fate of the double bond of the propagator under such conditions seemed speculative.

SUMMARY OF THE INVENTION

It has been discovered that, under particular conditions, a cationic ring-opening polymerization of a lactone in conjunction with an alcohol having a vinyl head group, and, an oxonium salt or etherate of boron trifluoride as the cationic ring-opening catalyst, a polylactone macromer is produced, having a vinyl functional head group at one end and a hydroxyl (OH) group at the other. The vinyl functional group of the alcohol does not undergo carbocationic polymerization under the acidic conditions required for the cationic ring-opening polymerization of the lactone used. The polymerization proceeds by polyaddition of the lactone to the OH group which is the propagating species.

It is therefore a general object of this invention to provide a process for the manufacture of a polylactone macromer having a vinyl functional head group and a hydroxyl group as the tail, comprising, polymerizing (A) a cationically ring-openable lactone having the structure:

wherein, n is an integer in the range from 4 to about 7;

$R^1$ is a group selected from hydrogen, $C_1$-$C_{20}$ alkyl (having from 1 to about 20 carbon atoms), preferably $C_1$-$C_6$ lower alkyl, cycloalkyl, alkoxy and phenyl, and the number of $R^1$ groups which are H is at least (n+2); and, (B) a primary or secondary alcohol having a terminal vinyl group, said alcohol being selected from the group consisting of (i) an acryloyl alcohol wherein the vinyl unsaturation is adjacent a carbonyl group as in the structure

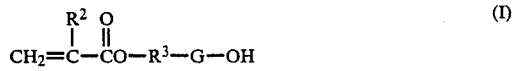

wherein $R^2$ is H or $C_1$-$C_{20}$ alkyl, preferably lower $C_1$-$C_5$ alkyl, and most preferably methyl;

$R^3$, if present, is selected from a saturated group consisting of branched or linear alkylene, haloalkylene, alkoxyl, haloalkoxyl, each $C_1$-$C_{20}$, aralkylene, haloaralkylene, aralkoxyl, and haloaralkoxyl, each $C_7$-$C_{20}$; if $R^3$ is absent, it is replaced with a bond between O and G; and, G is a polymeric spacer selected from the group consisting of polyether, containing no active hydrogen, i.e. no hydrogen attached to oxygen, nitrogen, or sulfur, and having a number average molecular weight Mn up to about 30,000;

(ii) a styrylically unsaturated primary or secondary alcohol wherein the ethylenic unsaturation is adjacent to an aromatic ring, represented by the structure

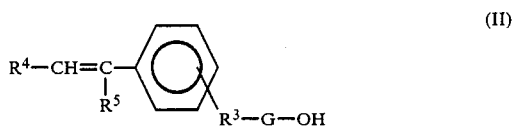

wherein, $R^3$ and G, if either is present, is in an ortho-, meta-, or para-position of the phenyl ring which may be substituted, said position being relative to that of the olefinically unsaturated group; when both $R^3$ and G are absent, they are replaced with a bond connecting the OH group to the ring; and, $R^4$ and $R^5$ are selected from the group consisting of hydrogen, $C_1$-$C_{10}$ alkyl and haloalkyl, and, at least one of $R^4$ and $R^5$ is always H; most preferably, both are H, or, if one is H, the other is $CH_3$;

(iii) an allylically unsaturated primary or secondary alcohol wherein the ethylenic unsaturation is adjacent to a saturated carbon atom, represented by the structure

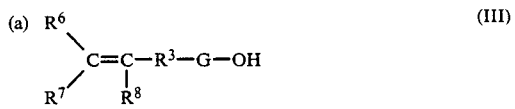

wherein only G is optionally present; or,

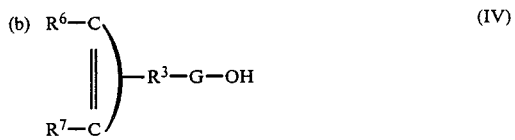

wherein, both $R^3$ and G are optionally present; that is, when both are absent, they are replaced with a bond directly connecting the OH group to the ring; and, $R^6$, $R^7$ and $R^8$ are independently selected from the group consisting of hydrogen, $C_1$-$C_{20}$ alkyl and haloalkyl, and, $C_6$-$C_{20}$ aryl and aralkyl; in the presence of an effective amount of (C) a cationic initiator selected from the group consisting of an oxonium salt and etherate of boron trifluoride;

so as to produce a polylactone macromer having the structure

wherein R represents the residue of said alcohol having a vinyl group, the structure being written to emphasize the terminal OH group, the O atom for which is from the last repeating polyester unit, M represents the polyester repeating unit of at least one said lactone which is ring-opened, and, m represents an integer in the range from 2 to about 500, more preferably from 2 to about 300.

It has further been found that a macromer block ester-ester or ester-ether copolymer may be prepared by polymerizing a first lactone with a second lactone, or an ether, sequentially, or, by using a macromer of this invention as a propagator, so as to have the structure

wherein, M' represents the ester repeating unit of the first lactone,

M" represents an ether repeating unit, or, an ester repeating unit of the second lactone; and, m' and m" are integers each in the range from 1 to about 300 such that m'+m"=m. An block ether-ester copolymer is covered by structure (LM).

It has also been found that a random comb-shaped copolymer of macromer may be prepared by polymerizing a polylactone macromer LM or V with an olefinically unsaturated monomer so as to have the structures

$$[R—(M)_m—OH]_{n'}[M_o]_{n''} \quad (VIa)$$

and,

$$[R—(M')_{m'}—(M'')_{m''}—OH]_{n'}[M_o]_{n''} \quad (VIb)$$

wherein $M_o$ represents the olefinically unsaturated monomer;

n' represents an integer in the range from 1 to about $10^4$, preferably $1-10^3$ and refers to the number of pendant OH-terminated polyester chains;

n" represents an integer in the range from 1 to about $10^5$, more preferably $1-10^4$; and, R, M, M', M", m, m' and m" have the same connotation as before.

It is a specific object of this invention to provide a macromer of a block copolymer of (a) ether-ester in which an essentially linear polyether having acryloyl and OH chain ends, is blocked to a polylactone, said block copolymer having the structure

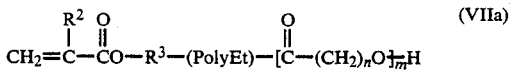
$$\begin{array}{c} R^2 \ O \quad\quad O \\ | \ \| \quad\quad \| \\ CH_2=C—CO—R^3—(PolyEt)—[C—(CH_2)_nO]_{\overline{m}}H \end{array} \quad (VIIa)$$

for example, polyalkylene glycol monoacryloylalkyl ether blocked to polycaprolactone, and, (b) ester-ether in which an essentially linear polyester having acryloyl and OH chain ends, is blocked to a polyether, said block copolymer having the structure

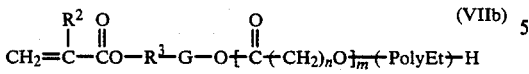
$$\begin{array}{c} R^2 \ O \quad\quad O \\ | \ \| \quad\quad \| \\ CH_2=C—CO—R^1—G—O+C+CH_2)_nO]_{\overline{m}}+PolyEt)—H \end{array} \quad (VIIb)$$

for example, monoacryloylalkyl ether of polycaprolactone diol blocked to polyepichlorohydrin, wherein $R^3$ is present, and G may be present, as stated before, and, if present, G may be the same as PolyEt.

PolyEt represents a polymer chain of from 2 to about 300 alkylene oxide units forming a polyether; and, m, n have the same connotation as given hereinabove; so that the block copolymer has substantially uniform molecular weight distribution such that its ratio of Mw/Mn is not above about 5.0, and preferably less than 2.0.

It is also a specific object of this invention to provide an essentially linear polylactone macromer having styrylic and OH chain ends, and the structure

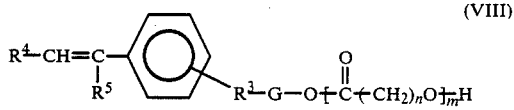
$$R^4—CH=C \overset{R^5}{\underset{}{-}} \langle \bigcirc \rangle —R^1—G—O+\overset{O}{\underset{\|}{C}}+CH_2)_nO]_{\overline{m}}H \quad (VIII)$$

wherein $R^4$ and $R^5$, m, n have the same connotation as before, and the macromer has substantially uniform molecular weight distribution such that its ratio of Mw/Mn is not above about 5.0, and preferably less than 2.0.

It is still another specific object of this invention to provide an essentially linear polylactone macromer having an allylic head and a terminal OH chain end, and a structure selected from

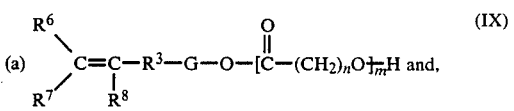
$$(a) \quad \begin{array}{c} R^6 \\ \phantom{x}\diagdown \\ \phantom{xx}C=C—R^3—G—O—[\overset{O}{\underset{\|}{C}}—(CH_2)_nO]_{\overline{m}}H \text{ and,} \\ \phantom{x}\diagup \quad | \\ R^7 \quad\quad R^8 \end{array} \quad (IX)$$

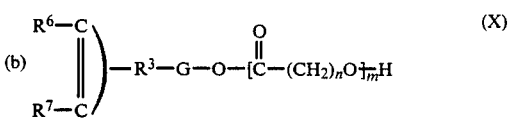
$$(b) \quad \begin{array}{c} R^6—C \\ \phantom{xx}\| \quad\rangle—R^3—G—O—[\overset{O}{\underset{\|}{C}}—(CH_2)_nO]_{\overline{m}}H \\ R^7—C \end{array} \quad (X)$$

said macromer having substantially uniform molecular weight distribution such that its ratio of Mw/Mn is not above about 5.0, and preferably less than 2.0.

It is another specific object of this invention to provide a macromer of block copolymer of ester-ester, or ester-ether, by polymerizing a first lactone with a second lactone, or, a cyclic ether, sequentially, or by using a macromer of this invention as a propagator, so as to have the structure (V) hereinabove.

It is a further specific object of this invention to provide comb copolymers having pendant polylactone chains of macromers by copolymerization of macromer with a conventional ethylenically unsaturated monomer $M_o$; such pendant chains are present when LM or V are polymerized to yield a polymr (VIa, b).

Still other specific objects of this invention are to provide (a) a macromer of random or block copolymer of lactone-epichlorohydrin which may be quaternized to yield antistats, fiber softeners, excipients for drugs and biomimetic agents; (b) poly(siloxane-ester) block copolymer surfactants and foam stabilizers by hydrosilylation; and, (c) radiation-curable polyurethanes to be used in coatings, adhesives, inks, printing plates, and binders.

DETAILED DESCRIPTION OF PREFERRED EMBODIMENTS

The cationic ring-opening polymerization disclosed herein occurs because of the specific acid catalysts used with the ethylenically-unsaturated alcohol used to function as a chain propagator for the ring-openable lactone. This reaction was not expected to produce the macromer of this invention with the specific catalysts used herein because it was not realized that the acryloyl, styryl and allylic groups of the alcohol would neither polymerize prematurely via carbocationic polymerization, not interfere with the lactone to be ring-opened by these catalysts.

Macromers of this invention have a number average mol wt Mn in the range from about 200 to about 30,000 though even higher mol wts up to about 50,000 may be formed, if desired. The term "macromer" is used herein to denote at least one of the ring-opened lactones specified by the above structure (L) which, when polymerized is terminated at one "head" end with an ethylenically unsaturated, or vinyl group. If the macromer is formed from a single lactone it is referred to as a "homomacromer"; if from more than one comonomer which appears randomly, it is referred to as a "macromer copolymer"; and, if a copolymer is specifically formed by sequential copolymerization so that it consists of definable polymer blocks, it is referred to as a "macromer block polylactone".

To facilitate this ring-opening polymerization which has "living" characteristics, so that the vinyl head group survives the reaction without forming undesired by-products, it is essential that one use (i) a catalytic amount of a catalyst (initiator) which is a borontrifluoride etherate complex; or, an oxonium salt of tetrafluoroboron, or hexafluorophosphate, or hexafluoroantimonate; and, (ii) an alcohol with one of the structures (I-IV) which is at least partially soluble, and more preferably, is completely soluble in the reaction mass, with or without a solvent.

If the lactone and the alcohol are not mutually soluble, or soluble in a mutual co-solvent, the polymerization will not proceed satisfactorily. The higher the solubility, generally the better the polymerization reaction. The reaction is most preferably carried out in a bulk polymerization in a simple and convenient manner.

Typically, the lactone (L) and one of alcohols (I-IV), each of which is moisture-free, are charged to a jacketed glass-lined reactor provided with a mechanical agitator and fitted with a thermoprobe and condenser. The reactor is purged with nitrogen and warmed to the polymerization temperature. The catalyst, for example, triethyloxonium hexafluorophosphate (TEOP) dissolved in methylene chloride is dripped in and the temperature of the reaction mass is controlled to provide a satisfactory rate of polymerization by raising or lowering the temperature of the circulating medium in the jacket.

The polymerization is generally carried out at a temperature in the range from about 25°–50° C. but this range is not critical, some polymerizations proceeding satisfactorily at as low as 0° C., or lower, and others at as high as 90° C., or higher. The progress of the reaction is monitored by measuring total solids. Upon completion, the polymerization is terminated with aqueous sodium bicarbonate solution, and an antioxidant such as Goodrite®3114 is added, and the temperature of the mixture raised to about 60° C. and maintained for about an hour. The macromer is separated from the aqueous phase and washed with distilled water at room temperature. Unreacted monomer, if any, may be removed by distillation under vacuum in the presence of an adequate amount of a suitable free radical polymerization inhibitor such as monoethyl ether of hydroquinone (MEHQ).

The conversion to the macromer and its mol wt are controlled by the ratio of the monomer to the alcohol, according to the following equation:

$$Mn = \left[\frac{\text{Monomer, g}}{\text{Alcohol, g}} + 1\right] \times \text{mol wt of alcohol} \times \% \text{ total solids}$$

About 0.1–2.0 parts of TEOP is used per 100 parts of monomer. The amount of sodium bicarbonate used as a short-stop is about three times the amount of TEOP. The amount of antioxidant added is about 0.2% by wt of the macromer. It is essential that all reactants be moisture-free because each molecule of water, if present, will initiate a polymer terminated with OH groups at both ends of the chain.

The macromer is characterized by gel permeation chromatography (GPC) analysis at 40° C. using a Water's 200 with columns packed with Styragel. THF is used as carrier solvent. All mol wts are calibrated relative to polystyrene. Relatively low molecular weight (mol wt) macromers, particularly those having from 2 to about 20 repeating units, are formed with substantially uniform mol wt distribution such that the ratio of the weight average mol wt (Mw) to the number average mol wt (Mn) is not substantially above about 5, preferably less than 2.

FT infrared spectra were recorded with a Nicolet 7199 spectrometer. Samples were prepared by applying a thin coat of macromer on a KBr crystal.

Carbon-13 NMR spectra were obtained at 20.1 MHz using a Bruker WP-80 spectrometer. Macromers were examined as a 20 wt% solution in benzene-$d_6$ or chloroform-d with internal tetramethylsilane reference at 30° C.

Proton NMR spectra were obtained at 200.13 MHz in chloroform-d at 30° C. using a Bruker WH-200 spectrometer. Trichloroacetylisocyanate was used as a derivatizing agent for the OH group analysis.

Mass spectra were obtained with a Varian MAT 311A mass spectrometer in the field desorption mode. Samples were dissolved in either methanol or THF. The solution was then saturated with solid LiBr so that the lithiated molecular ions [MLi]+ were produced during analysis.

Glass transition temperature ($T_g$) and melting point is determined by a Perkin-Elmer DSC-2 differential scanning calorimeter at a 40° C./min heating rate under helium.

Hydroxyl number (OH No.) was determined by acetylation with an acetyl anhydride-pyridine mixture according to ASTM D-4274 procedure and the end point is determined by automatic titration. The OH No. is defined as the milligram equivalent of KOH per gram of the macromer, where a mole of KOH is equivalent to one mole of OH group.

Iodine number is determined by addition of iodine monochloride to the olefinic double bond according to Wijs method (ASTM D-460). Excess IC1 added is determined by titration with thiosulfate. Iodine No. is defined as the grams of iodine absorbed per 100 g of polymer.

Most preferred among the lactones having structure (L), which may be used, is epsilon-caprolactone wherein n is 4, and at least 6 of $R^1$s are H, with the remainder of the $R^1$s being substituents selected from those identified hereinabove, provided the total number of C atoms in the $-(CR^1_2)_4-$ groups does not exceed 12. Preferred substituents are $C_1-C_{12}$ alkyl, for example, monoalkyl epsilon-caprolactones like methyl epsilon-caprolactone, or a mixture of isomeric methyl epsilon-caprolactones, or a mixture of isomeric methyl epsilon-caprolactones with epsilon-caprolactone, and dodecyl epsilon-caprolactone; also, dialkyl epsilon-caprolactones in which the two alkyl groups are substituted on the same or different C atoms, but not both on the epsilon C atom; and, trialkyl epsilon-caprolactones in which two or three C atoms in the lactone ring are substituted, but the epsilon C atom is not substituted. Also usable are lactones having more than 6C atoms in the ring, such as zeta-enantholactone and eta-caprylolactone, but they are less preferred. Substituted and unsubstituted epsilon-caprolactone are obtained by oxidizing the corresponding cyclohexanone, and the zeta-enantholactone from cycloheptanone.

Acryloyl-terminated lactone macromers have the structure (LM) wherein R is the residue of an "acryloyl" alcohol, specifically a hydroxyalkyl ester of acrylic or methacrylic acid, the alcohol having the structure

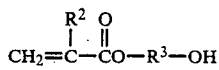

and derivatives thereof, for example hydroxyethyl acrylate, in which the vinyl unsaturation of the head, and the terminal OH group are preserved.

Block copolymers having the structure (VIIa) are prepared with an acryloyl terminated macromer of polyether having the structure (I) in which G is polyether having a number average molecular weight up to about 30,000, so that the acryloyl polyether is represented by the structure

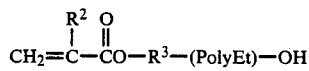 (VIII)

the O of the OH group being contributed by the last repeating unit of the polyether, and, wherein PolyEt represents at least one cyclic ether such as (A) a 1,2-epoxide, for example ethylene oxide, propylene oxide and the like; (ii) 1,3-epoxide, for example oxetane; and (iii) haaloalkyl epoxides (epihalohydrins) for example, 1-chloro-2,3-epoxypropane (ECH), 3-chloro-4,5-epoxyoctane, and the like;

(B) a 1,4-epoxide, for example tetrahydrofuran (THF);

(C) a 1,6-epoxide, for example oxepane (OXP);

(D) aliphatic or aromatic glycidyl ethers, for example, methyl glycidyl ether, ethyl glycidyl ether, phenyl glycidyl ether and the like.

For example, polypropylene glycol monoacryloylethyl ether has the structure

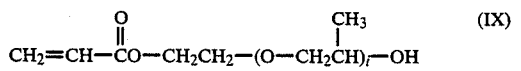 (IX)

wherein i is an integer in the range from 2 to about 500.

Other acryloyl polyethers which may be used are:
polypropylene glycol monomethacryloylethyl ether
polypropylene glycol monoacryloylpropyl ether
polypropylene glycol monoacryloylbutyl ether
polytetramethylene ether glycol monoacryloylethyl ether
polytetramethylene ether glycol monomethacryloylethyl ether
polyepichlorohydrin glycol monoacryloylethyl ether,
polyepichlorohydrin glycol monomethacryloylethyl ether,
poly(tetramethylene ether/ethylene)glycol monoacrylyethyl ether, and
poly(tetramethylene ether/propylene)glycol monoacryloylethyl ether.

The acryloyl polyether macromer used as the propagator is formed by the action of a cationic ring-opening catalyst identified hereinabove with an alcohol with an acrylic head and the appropriate alkylene oxide, under mild reaction conditions, namely a temperature in the range from about 0° C. to about 150° C., and more preferably from about 25°-80° C., at ambient or slightly elevated pressure.

The catalyst for synthesis of my macromer is used in an amount sufficient to initiate the lactone polymerization to form the macromer. It is most preferred to use a cyclic or acyclic oxonium salt which may be secondary or tertiary. The cyclic oxonium salt may be prepared by reaction of an acyclic oxonium salt with THF. It is most preferred to use a trialkyloxonium or other oxonium salt of the $HMF_6$ acid prepared as described in U.S. Pat. No. 3,585,227 and U.S. Pat. Re. 31,577 the disclosures of which are incorporated by reference thereto as if fully set forth herein. The amount of catalyst used has very little effect on the mol wt of the macromer formed, but affects the rate, which in turn affects the temperature of the reaction. The amount used is in the range from about 0.001 part to about 3 parts per 100 parts by wt of lactone monomers, and more preferably from about 0.1 to about 1 part, being generally sufficient. It is desirable, both for economic reasons and for control of the polymerization, to keep the amount of catalyst used as low as possible.

The mol wt is controlled by the ratio of lactone to acryloyl polyether. Because the polymerization proceeds via polyaddition, a designed (desired) mol wt may be obtained. Most preferred linear macromers have a Mn in the range from about 200 to about 30,000.

Styrylically terminated lactone macromers having the structure (LM) wherein R is the residue of the "styrylic" alcohols having the structure (II) may also be prepared. Among these monoolefinically unsaturated "styrlyic" alcohols are ortho-, meta- and para-derivatives, or mixtures of derivatives of hydroxyl styrene and hydroxyl alpha-methyl styrene (wherein spacer $R^3$ and G are absent), vinyl benzyl alcohol 2-hydroxyethyl styrene 2-hydroxypropyl styrene, 2-hydroxypropyl alpha-methyl styrene and 3-hydroxyl-4-methoxyl styrene (wherein $R^3$ is a methylene, ethylene and propylene group, respectively and G is absent).

When a styrylically terminated macromer of block ether-lactone copolymer is desired, then the spacer is $R^3+G$, and preferred styrylically terminated polyethers (II) which may be used are:
polypropylene gycol monovinylbenzyl ether
polypropylene glycol monostyryl ether
polytetramethylene ether glycol monovinylbenzyl ether and,
polyepichlorohydrin glycol monovinylbenzyl ether.

The foregoing styryl-ended polylactones, homopolymers or block copolymers, are prepared in a manner analogous to that set forth hereinabove for macromers of block ether-lactone copolymers propagated from an acryloyl-ended polyether, and more fully in my aforementioned Ser. No. 796,634 the disclosure of which is incorporated by reference thereto as if fully set forth herein.

Allylically terminated lactone macromers having the structure (LM) wherein R is the residue of the "allylic" alcohols having the alicyclic structure (III) wherein spacer $R^3$ must be present, and G is absent, may be prepared with (a) relatively short chain alcohols having from 3 to about 6 carbon atoms such as allyl alcohol, 2-methyl-2-propene-1-ol (2-methallyl alcohol), 2-buten-1-ol (crotyl alcohol), 1-buten-3-ol (1-methallyl alcohol), 3-buten-1-ol, 4-penten-1-ol, 2-pentene-1-ol, 3-penten-2-ol, 4-penten-2-ol, 2-methyl-1-buten-3-ol, 2-methyl-1-buten-4-ol, 3-methyl-2-buten-1-ol, 2-ethyl-1-propen-3-ol, 2-ethyl-1-penten-3-ol, 5-hexen-1-ol, 4-hexen-1-ol, 5-hexene-1-ol, 2-methyl-1-penten-3-ol, 2-methyl-4-penten-3-ol, 4-methyl-3-penten-1-ol, and the like;

(b) relatively long chain alcohols having from 7 to about 20 carbon atoms such as 9-decen-1-ol, 10-undecen-1-ol (10-undecylenyl alcohol), and naturally occurring citronellol, oleyl alcohol or phytol;

(c) arylalcohols in which the OH group is on the sidechain such as cinnamyl alcohol, and those in which the OH group is a phenolic OH group such as 2-allyl phenol; and, (d) monoadducts of a single 1,2-epoxide unit to the above mentioned "allylic" alcohols, such as 2-hydroxyethyl allyl ether, 2-hydroxy-1-methylethyl allyl ether, 2-hydroxy-2-methylethyl allyl ether, 4-hydroxybutyl allyl ether, diethylene glycol monoallyl ether, 2-hydroxy-2-chloromethyl ethyl allyl ether, and the like.

When a macromer of block copolymer of ether-lactone terminated with an alicyclic allyl group is desired, then the polymeric spacer is $R^3+G$, so that an allyl-ended polyether is represented by the structure

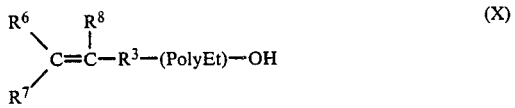

the O of the OH group being contributed by the last repeating unit of the polyether, as for example in polypropylene glycol monoallyl ether having the structure

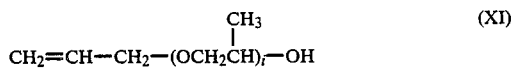

wherein $R^6$, $R^7$ and $R^8$ are each H, $R^3$ is a methylene group, and PolyEt is

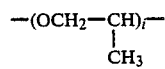

Other allyl-ended polyethers which may be used are:
polypropylene glycol monomethallyl ether
polypropylene glycol monocinnamyl ether
polypropylene glycol mono(4-allyloxybutyl)ether
polytetramethylene ether glycol monoallyl ether
polytetramethylene ether glycol monomethallyl ether
poly(tetramethylene ether/ethylene)glycol monoallylethyl ether,
poly(tetramethylene ether/propylene)glycol monomethallylethyl ether
polyepichlorohydrin glycol monoallyl ether, and,
polyepichlorohydrin glycol monomethallyl ether.

Allylically terminated lactone macromers having the structure (LM) wherein R is the residue of the "allylic" alcohols having the cyclic structure IV may also be prepared. Cyclic oleinic alcohols, wherein G is absent, which may be used are those in which the olefinic bond is in the ring which may be a single or fused ring structure having from 5 to 10 carbon atoms, such as for example, 2-cyclopenten-1-ol, 2-cyclohexen-1-ol, 3-methyl-2-cyclohexen-1-ol, 3-cyclohexen-1-methanol, Nopol, dihydrocarveol, myrtenol, patchenol, 6,6-dimethyl bicyclo[3.3.1]hept-2-ene-2-ethanol[(1S)-(—)-Nopol], 5-norbornene-2-methanol, and bicyclo(2.2.2)oct-5-ene-2-methanol.

When a macromer of block copolymer of ether-lactone terminated with a cyclic allyl group is desired, then the polymeric spacer is $R^3+G$ so that preferred allyl-ended polyethers which may be used are:
polypropylene glycol mono(5-norbornene-2-methyl)ether
polypropylene glycol mono(3-cyclohexen-1-methyl)ether
polytetramethylene ether glycol mono(5-norbornene-2-methyl)ether, and,
polyepichlorohydrin glycol mono(5-norbornene-2-methyl)ether.

The foregoing allyl-ended polylactones, homopolymers or copolymers are prepared in a manner analogous to that set forth hereinabove for macromers of block etherlactone copolymers propagated from an acryloyl-ended polyether, and more fully in my aforementioned Ser. No. 771,093 the disclosure of which is incorporated by reference thereto as if fully set forth herein.

It is now evident from the foregoing that the use of vinyl-functional macromers of polylactones as propagators result in block copolymers of lactone-lactone or lactone-ether having the general structure (V) hereinabove.

The terminal OH group of the lactone macromers (LM) and (V) are in some cases required to be end-capped with an end-capping group so that there is no OH group to interfere with the subsequent utilization (in a reaction or copolymerization) of the double bond of the macromer. The end-capping group is not narrowly critical and a variety of esterification and etherification reactions may be used to cap the terminal OH groups, as for example disclosed in U.S. Pat. Nos. 2,998,409 and 3,507,927; British Pat. Nos. 748,856; 848,660; 869,323; 877,256; 911,959; inter ali; or, by reacting with an alkylisocyanate as in British Pat. No. 924,259; or, by reacting with diazomethane as in British Pat. No. 894,439; or, by reacting with acrylonitrile or trialkylchlorosilane.

The preferred end-capped macromer is represented by the structure

wherein Z is the residue of an end-capping unit selected from the group consisting of

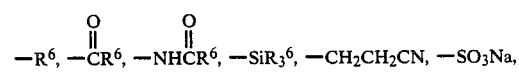

and the like, wherein $R^6$ has the same connotation as that given hereinabove.

The macromers of polylactones, end-capped or not end-capped, depending upon which of the foregoing ethylenically unsaturated head groups is present, and the structure and length of its chain, may be tailored to provide a wide variety of properties in polymers formed with them in subsequent polymerizations. Such polymerizations include:

1. Grafting the macromer on a polymer by a free radical reaction initiated by an appropriate initiator or by radiation.
2. Forming a comb copolymer by copolymerizing the macromer with a copolymerizable monomer by:
   a. free radical polymerization
   b. metathesis polymerization
   c. group transfer polymerization.
3. Forming an ester-siloxane block copolymer by a hydrosilation reaction.

Graft copolymers of macromer may be derived by polymerizing a macromer with or without a comonomer of ethylenically unsaturated monomer, onto a polymer backbone initiated by a free-radical or radiation. Graft-polymerization is a well-known art (see for example "Graft Copolymers" by Battaerd, H. A. J. and Tregear, G. W., Interscience Publishers, New York 1967). The graft copolymerization may be effected by any of the conventional techniques of emulsion, bulk, suspension and solution polymerization. Polymerization may be initiated by heat, peroxide, or hydroperoxide decomposition, redox catalysts, or any other free-radical generation, such as by radiation. The chemical nature of the polymer is not critical so long as it contains no groups which inhibit polymerization. However, polymers lacking in reactive groups generally give low yields of grafted material. For many industrial applications, the presence of only 2–5% of graft copolymer is sufficient to improve the physical properties of the unmodified material.

Comb copolymers of macromers may be derived from a macromer with one or more conventional ethylenically unsaturated monomers. The length to which the backbone is grown may be controlled by conventional means to provide the desired mol wt of the comb copolymer. It will be recognized that the length of each pendant polylactone chain is fixed by the mol wt of the macromer. The relative molar amount of the lactone macromer to a copolymerizable monomer will preferably range from about 3(macromer):1 (monomer) to about 1(macromer):1000(monomer). When only macromer is homopolymerized the comb homopolymer formed has only polylactone pendant chains.

Monomers suitable for forming comb copolymers include:

(i) $C_2$–$C_{12}$ vinyl monomers such as readily available vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinyl toluene, vinylidene chloride, N-vinyl carbazole, and the like;

(ii) $C_8$–$C_{16}$ styryl monomers such as styrene, 4-chlorostyrene, alpha-methyl styrene, and the like;

(iii) alpha,beta-ethylenically unsaturated carboxylic acids having from 3 to 8 carbon atoms, and derivatives thereof selected from the group consisting of esters of $C_1$–$C_{20}$ alcohols such as ethyl acrylate, ethyl methacrylate, glycidyl acrylate, butyl acrylate; acrylamide and amides of $C_1$–$C_{20}$ amines such as N,N-dimethylacrylamide; and, metal salts such as sodium acrylate;

(iv) $C_4$–$C_8$ diene monomers such as butadiene and isoprene;

(v) $C_5$–$C_{10}$ allylically unsaturated monomers such as allyl acetate, and diallylphthalate; and, (vi) $C_5$–$C_{14}$ cyclic olefins such as norbornene, dicyclopentadiene, cyclopentene, 1,5-cyclooctadiene and norbornadiene.

When the lactone macromer contains an acryloyl or styryl head (VII and VIII), one or more of the copolymerizable monomers is preferably selected from (i)–(v), and more preferably from (i)–(iv). When the monomer is from (v) a lactone macromer with an allylic head (IX) is most preferred. Free-radical chain polymerization, commonly used in the art, as described in "Encyclopedia of Polymer Science and Technology" Vol 7, Interscience Publishers, New York (1967), is preferred for all the polymerizations. It is typically carried out with a free-radical initiator and can be carried out in bulk, mass, solution, slurry emulsion, or dispersion polymerization.

When a monomer is used from (vi), the lactone mcromer preferably has a head derived from a cyclic olefin (X) and end-capped. Metathesis polymerization, described for example in U.S. Pat. No. 3,853,830, is preferred.

When the comb copolymers of macromers are to be made by group transfer polymerization as described in U.S. Pat. Nos. 4,417,034 and 4,508,800, the preferred lactone macromer contains a methacryloyl head (VII), as is also the case when only a monomer from (iii) is used.

An ester-siloxane block copolymer of the macromer is prepared from end-capped macromers possessing an allyl head group (IX and X) by hydrosilylation.

An organohydrosiloxane reactant may be a mono-, di-, or polyhydrosiloxane containing more than one Si-bonded H atoms, wherein any valences of Si not bonded to H or to O in a Si to O to Si bond are bonded to a monovalent hydrocarbon or halohydrocarbon group, such as those disclosed in greater detail in U.S. Pat. No. 4,150,048 to Schilling et al, the disclosure of which is incorporated by reference thereto as if fully set forth herein. Particularly preferred organohydrosiloxanes have a Si-bonded H at each end as shown by the formula $$HR''_2SiO[R''_2SiO]_zSiR''_2H \qquad (XVI)$$

in which R'' is an unsubstituted or halogen-substituted monovalent hydrocarbon group and z is an integer in the range from 0 to about 300, more preferably 5 to 50.

The block copolymer is formed under addition reaction conditions, preferably at elevated temperature from about 50°–100° C. in the presence of a non-reactive solvent, and catalyzed by a neutral Pt-containing hydrosilation catalyst such as that described in U.S. Pat. No. 3,220,972, or Pt metal deposited on charcoal, used in concentrations disclosed in U.S. Pat. No. 3,507,815, namely from 0.001 to about 5% by wt of the reactants.

The ester-siloxane block copolymer of macromer formed with a polyhydrosiloxane may be represented by the formula $$A'A''_2$$

wherein A' represents the residue of a polysiloxane block (XVI) and A'' represents the residue of a polylactone block of end-capped macromer.

When used as a comonomer, a macromer of this invention may serve as an internal non-extractable plasticizer for many plastics such as "PVC", poly(vinyl chloride). Because polylactones are known to be compatible with many synthetic resinous materials, copolymers made from my macromers may be used as modifiers to improve impact, heat distortion temperature (HDT), and processability. Pendant polylactone chains of the copolymer of the macromer can be used as the compatibilizing agent to compatibilize two incompatible polymers. For example, elastomeric copolymers of macromer and butyl acrylate or ethyl acrylate are impact modifiers for PVC and nylon; non-elastomeric copolymers of macromer and alpha-methylstyrene or methyl-methacrylate are useful to improve the HDT or PVC.

In addition to copolymers of macromers, macromers of this invention may be used for the preparation of radiation-curable polyurethanes as described in U.S. Pat. Nos. 3,850,770; 4,377,679 and 4,552,932. Radiation curable polyurethanes are useful in coating adhesives, inks, printing plates and binders.

Preparation of allylically terminated lactone macromer

A. In the following three illustrative examples allyl-headed macromers of polylactones are prepared in a glass reactor equipped with a mechanical agitator, a thermometer, and a condenser under a nitrogen atmosphere, by bulk polymerization. The reactor is conditioned by purging with nitrogen while heating with a heat gun. While maintaining a nitrogen blanket, sieve-dried caprolactone (CPL) and allyl alcohol (AA) were charged into the reactor and the solution brought to 35°–40° C. Then TEOP (triethyloxonium hexafluorophosphate) dissolved in a small amount of sieve-dried methylene chloride was then added incrementally. As soon as the polymerization was initiated, cooling was applied to the reactor to hold the temperature at 35°–40° C. The polymerization was followed by measuring the total solids. Upon completion, the polymerization was terminated with an aqueous soln of sodium bicarbonate, antioxidant (Goodrit ®3125) and MEHQ. The mixture is heated at 60° C. for 1 hr. The macromer is separated from the aqueous phase and washed twice with distilled water at room temperature. The unreacted monomer was removed at 75° C. under vacuum. The amount of sodium bicarbonate used as a short-stop was about three times the amount of TEOP. Antioxidant (Goodrite 3125) and MEHQ were added in amounts of 0.2 wt % and 500 ppm respectively.

Macromers are produced from caprolactone (CPL) by polymerization with allyl alcohol (AA) as propagator in three runs under conditions recorded herebelow in Table I. The results from each of the three runs are also set forth. It is evident that the Mn obtained from OH number, from stoichiometry, and from iodine number, show excellent correlation with the different molar ratios of CPL/AA used, and for the conversion, while maintaining a narrow distribution of mol wt. The dashed lines in the columns indicate that the particular measurement was not made.

TABLE I

| ALLYL-ENDED MACROMONOMERS OF POLY-CAPROLACTONE | | | |
|---|---|---|---|
| Example No. | 1 | 2 | 3 |
| Monomer | CPL | CPL | CPL |
| wt., g | 92.51 | 1000. | 1500. |
| moles | 0.81 | 8.77 | 13.16 |
| Propagator | AA | AA | AA |
| wt., g | 7.80 | 40.0 | 40.0 |
| moles | 0.13 | 0.69 | 0.69 |
| CPL/AA (molar) | 6.04 | 12.74 | 19.11 |
| TEOP, g | 0.21 | 2.50 | 4.0 |

TABLE I-continued

| ALLYL-ENDED MACROMONOMERS OF POLY-CAPROLACTONE | | | |
|---|---|---|---|
| Example No. | 1 | 2 | 3 |
| wt. % | 0.21 | 0.24 | 0.26 |
| Pzn. Temp., °C. | 40. | 35. | 35. |
| Pzn. Time, hr. | 6. | 5. | 6. |
| Conversion, % | 95. | 81. | 82. |
| GPC Mn | 1180. | 2250. | — |
| Mw/Mn | 1.4 | 1.7 | |
| Tg by DSC, °C. | −85. | — | −63 |
| Hydroxyl Number by titration | 74 | 42 | 25 |
| Iodine number | 31 | 22 | 13 |
| Mn from GPC | 1180 | 2250 | — |
| from OH number (titration) | 758 | 1336 | 2244 |
| from Stoichiometry | 707 | 1223 | 1834 |
| from Iodine Number | 819 | 1155 | 1954 |

The allyl-terminated macromer of polylactones obtained are low melting solids with a melting point in the range from about −60° to about −85° C. FT infrared spectra of macromers show characteristic absorptions at 3400–3500 cm$^{-1}$ the terminal OH group, and at 3080 and 1650 cm$^{-1}$ for the terminal allyl group, and at 2855 and 2945 cm$^{-1}$ for the C—H stretchings and 1724 cm$^{-1}$ for the carbonyl stretching, and 1167, 1156 and 1246 cm$^{-1}$ for the C—O single bond stretchings corresponding to the polylactone backbone.

The proton NMR spectra of the macromers show characteristic chemical shifts at 4.1(d), 5.2(d), 5.3(d) and 5.9(m) ppm for the terminal allyl group; at 2.8 ppm as a singlet for the proton of the OH group; and, at 3.65 ppm for the protons of the methylene group of the repeating unit adjacent the terminal OH group. The proton NMR spectra of macromers also show characteristic chemical shifts at 1.4(p,2H), 1.65(p,4H), 2.30(t,2H), and 4.06(t,2H) ppm corresponding to the repeating units of the polycaprolactone backbone.

The carbon-13 NMR spectra of macromers show characteristic chemical shifts at 65.1, 117.9, and 133.9 ppm for the terminal allyl group and at 62.3 ppm for the methylene carbons of the repeating unit adjacent the OH group, and at 33.2 ppm for the methylene carbons of the repeating unit adjacent the terminal allyl group. Carbon-13 NMR spectra also show characteristic chemical shifts corresponding to the repeating units of polylactone at 25, 26, 29, 34, and 68 ppm for the methylene carbons and at 174 ppm for the carbonyl carbon.

FD mass spectra show (i) a predominant species with mol wts of 58+114m corresponding to a formula of [AA+(CPL)$_m$] for the lactone macromer; and (ii) minor series of unknown species with mol wts of 29+114m and 86+114m, which may be ion fragments of macromer species. No species of macromer terminated at each end with an allylic group is detected in FD mass spectra. Species terminated at each end with an unsaturated group are highly undesirable as they would provide crosslinking when the macromer is polymerized.

The structure of macromers of polylactones terminated at one end with an allyl group and at the other with a OH group was further corroborated by end group analysis (Table I). The corroborating mol wts from OH number, iodine number and stoichiometry, indicate only one allyl group and one OH group per chain as in the structure:

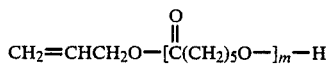

Determination of mol wt by GPC calibrated with respect to polystyrene gave a much higher value than the actual mol wt, but showed no cyclic oligomers. The mol wt distribution of the macromers is in the range from about 1.4 to about 2.0. The mol wt of macromer in Ex 1 was also determined by vapor pressure osmometry. A value of 790 was obtained which is considerably lower than the value of 1100 obtained by GPC but matches values obtained by end group analyses.

In a manner analogous to that described hereinabove, lactone macromers having mol wts in the range from 750 to 2500 (calculated from OH numbers) are prepared with 2-methyl-2-propene-1-ol, undecenyl alcohol, cinnamyl alcohol, and allyl phenol respectively, and analysis confirms that each has allylic unsaturation at one end of each chain, and an OH group at the other.

It is to be noted that only primary and secondary alcohols provide the desired lactone macromers with a terminal allylically unsaturated group, and tertiary alcohols do not. For example, polymerization with 3-butene-2-ol produces no allylic termination in the polylactone obtained.

B. In a manner analogous to that described hereinabove, a terminal, ethylenically unsaturated cycloaliphatic ring is provided by polymerization of 150 g (1.32 mole) CPL, and 17.0 g (0.14 mole) 5-norbornene-2-methanol (NOR) catalyzed with 0.4 g (0.24 wt %) TEOP. After 5 hr at 88% conversion, polymerization was terminated as described hereinbefore, and the macromer separated from the aqueous phase.

The lactone macromer obtained is characterized as a low melting solid having a mol wt of 1305 (calculated from a OH number of 43). FT infrared spectra are not informative as the olefinic absorptions of the terminal head group are overlapped by absorptions of polycaprolactone. The carbon-13 NMR spectra of the macromer shows characteristic chemical shifts of a polycaprolactone backbone and at 138.3, 137.8, and 133.1 ppm for the olefinic carbons of the norbornene group. FD mass spectra show a predominant species with mol wt of 124+114m corresponding to a formula of [NOR+(CPL)$_m$] for the lactone macromer having a structure:

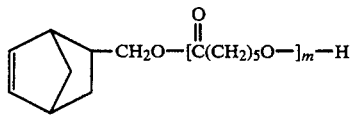

Preparation of styrylically terminated lactone macromer

In the following illustrative example, in a manner analogous to that described hereinabove, a styryl-terminated lactone macromer is prepared with a terminal, styrylically unsaturated head group by polymerization of 50 g (0.44 mole) of CPL, and 8.0 g (0.006 mole) vinyl benzyl alcohol (VBA) catalyzed with 0.4 g (0.24 wt %) TEOP. After 6 hr at 71% conversion, polymerization was terminated as before, the macromer separated from the aqueous phase and washed twice with a mixture of 10/90 by wt methanol/water at room temperature to remove unreacted monomer and catalyst residues. The polymer was dried at 55° C. under vacuum.

The lactone macromer obtained is characterized as a low melting solid (Tg −78° C.) having a mol wt of 738 (calculated from a OH number of 74). FT infrared spectra show characteristic absorptions of polycaprolactone and a terminal OH group as described hereinabove. In addition, absorptions corresponding to the stretchings of the aromatic ring are observed at 1600–1700 cm$^{-1}$. The terminal vinyl benzyl group is also detected by C-13 NMR with chemical shifts:

Further evidence of the foregoing structure is provided by FD mass spectra which show a series of predominant species with mol wt of 134+114n corresponding to the formula [VBA+(CPL)$_n$], for a macromer having the structure:

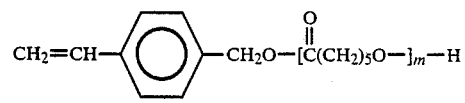

No species terminated with a vinyl benzyl group at each end is obtained.

Preparation of acryloyl terminated macromer of block copolymer of ether-ester In the following illustrative example, in a manner analogous to that described hereinabove, an acryloyl-terminated macromer of block copolymer of ether-ester is prepared by polymerization of 250 g (2.91 mole) CPL, and 100 g (0.11 mole) of polyepichlorohydrin glycol monoacryloylethyl ether synthesized according to U.S. Pat. No. Re. 31,468, so as to have a mol wt of 890 as calculated from a hydroxyl number of 63, catalyzed with 1.0 g (0.28 wt %) TEOP. After 6 hr at 85% conversion, polymerization was terminated as before, the macromer separated from the aqueous phase and washed twice with a mixture of 10/90 by wt methanol/water at room temperature to remove unreacted monomer and catalyst residues. The polymer was dried at 55° C. under vacuum.

The macromer of block copolymer of ether-ester obtained has a mol wt of 2550 (calculated from a OH number of 22). The weight ratio of ester/ether blocks in the macromer is about 2.1.

The macromer of block copolymer of ether-ester has a structure:

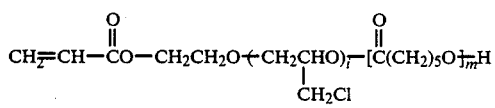

Preparation of allylically terminated macromer of block copolymer of ester-ether In the following illustrative example, in a manner analogous to that described hereinabove, an allylically-terminated macromer of block copolymer of ester-ether is prepared by polymerization of 250 g (2.70 mole) ECH, and 100 g (0.13 mole) of allyl-terminated macromer of polycaprolactone made in Example 1 having a mol wt of 758 calculated from a hydroxyl number of 74, catalyzed with 1.0 g (0.28 wt %) TEOP. After 6 hr at 90% conversion, polymerization was terminated as before, the macromer separated from the aqueous phase and washed twice with a mixture of 10/90 by wt methanol/water at room temperature to remove unreacted monomer and catalyst residues. The polymer was dried at 75° C. under vacuum.

The macromer of block copolymer of ester-ether obtained has a mol wt of 2158 (calculated from a OH number of 26). The weight ratio of ether/ester blocks in the macromer is about 2.0.

The macromer of block copolymer of ester-ether has a structure:

$$CH_2=CH-CH_2O+C(CH_2)_5O\overline{)_m}+CH_2CHO\overline{)_{m''}}-H$$
$$\qquad\qquad\qquad\qquad\qquad\qquad\qquad\quad |$$
$$\qquad\qquad\qquad\qquad\qquad\qquad\qquad\quad CH_2Cl$$

In the foregoing macromers, G is a polymeric spacer, preferably having a Mn from 200 to about 10,000, derived from
(i) alkylene oxide having the structure $$R^9-CH-(CH_2)_x-\underset{R^{11}}{\overset{O}{\underset{|}{C}}}-R^{10}$$

wherein,
x is an integer in the range from 0 to about 4, except that when x>1, a second alkylene oxide having x=1 or 0 must be present, and,
$R^9$, $R^{10}$ and $R^{11}$ are independently selected from the group consisting of hydrogen, $C_1$–$C_{20}$ alkyl and haloalkyl, and, $C_6$–$C_{20}$ aryl and aralkyl, and, at least one of $R^9$, $R^{10}$, and $R^{11}$ is hydrogen; and,
(ii) aliphatic or aromatic glycidyl ether having the structure $$R^9-CH-CH-CH_2-O-R^{12}$$

wherein $R^{12}$ represents a member selected from the group consisting of a substituted group such as a hydrocarbon group, i.e. $C_1$–$C_{20}$ alkyl or substituted alkyl, particularly haloalkyl, alkoxyalkyl, aryl (Ar) or substituted aryl (Ar—Q), particularly wherein Q represents $C_1$–$C_{10}$ alkyl, or haloalkyl.

I claim:
1. A process for the manufacture of a polylactone macromer having an ethylenically unsaturated functional group near one end and a hydroxyl group at the other, comprising, polymerizing
(A) a cationically ring-openable lactone having the structure:

$$R^1CH-(CR_2^1)_n-C=O \qquad (L)$$
$$\underline{\qquad\qquad\qquad\qquad}O$$

wherein, n is an integer in the range from 4 to about 7;

$R^1$ is a group selected from hydrogen, $C_1$–$C_{20}$ alkyl, cycloalkyl, alkoxy and phenyl, and the number of $R^1$ groups which are H is at least (n+2); and,
(B) an ethylenically unsaturated primary or secondary alcohol selected from the group consisting of
(i) an acryloyl alcohol wherein the ethylenic unsaturation is adjacent a carbonyl group as in the structure $$\underset{CH_2=C-CO-R^3-G-OH}{\overset{R^2\quad O}{\underset{|\quad\;\;\;||}{}}} \qquad (I)$$

wherein $R^2$ is H or alkyl having from 1 to about 20 carbon atoms ($C_1$–$C_{20}$);
$R^3$, if present, is selected from the group consisting of branched or linear alkylene, haloalkylene, alkoxyl, haloalkoxyl, each $C_1$–$C_{20}$, aralkylene, haloaralkylene, aralkoxyl, and haloaralkoxyl, each $C_7$–$C_{20}$;
G is a polymeric polyether spacer containing no active hydrogen, and having a number average molecular weight Mn up to about 30,000;
(ii) a styrylically unsaturated primary or secondary alcohol wherein the ethylenic unsaturation is adjacent an aromatic ring, said alcohol represented by the structure $$R^4-CH=\underset{R^5}{\overset{|}{C}}-\text{Ar}-R^3-G-OH \qquad (II)$$

wherein, $R^3$ and G, if either is present, is in an ortho-, meta-, or para-position of the phenyl ring which may be substituted, said position being relative to that of the olefinically unsaturated group; and,
$R^4$ and $R^5$ are selected from the group consisting of hydrogen, $C_1$–$C_{10}$ alkyl and haloalkyl, and, at least one of $R^4$ and $R^5$ is always H;
(iii) an allylically unsaturated primary or secondary alcohol represented by the structure (a) $$\underset{R^7}{\overset{R^6}{\underset{\diagup}{\diagdown}}}C=C-R^3-G-OH \qquad (III)$$
$$\qquad\qquad\qquad\;\; |$$
$$\qquad\qquad\qquad\;\; R^8$$

wherein only G is optionally present; or (b) $$\underset{R^7-C}{\overset{R^6-C}{\diagdown\!\!\!\diagup}}-R^3-G-OH \qquad (IV)$$

wherein, both $R^3$ and G are each optionally present;
$R^6$, $R^7$ and $R^8$ are independently selected from the group consisting of hydrogen, $C_1$–$C_{20}$ alkyl and haloalkyl, and, $C_6$–$C_{20}$ aryl and aralkyl; in the presence of an effective amount of
(C) a cationic initiator selected from the group consisting of an oxonium salt and etherate of boron trifluoride at a temperature in the range from 0° C. to 90° C.; so as to produce a macromer having substantially uniform molecular weight distribution such that its ratio of Mw/Mn is not above 5.0, with conversion in the range from about 81% to about 95%, said macromer having the structure R—(M)$_m$—OH  (LM)

wherein R represents the residue of said alcohol having a vinyl group,

M represents the polyester repeating unit of at least one said lactone which is ring-opened, and, m represents an integer in the range from 2 to about 500.

2. The process of claim 1 wherein said macromer is a block copolymer of
(a) ether-ester of an essentially linear polyether macromer having acrylic and OH chain ends, blocked to a polylactone, said macromer of a block copolymer having the structure

  (VIIa)

(b) ester-ether in which an essentially linear polyester having acryloyl and OH chain ends, is blocked to a polyether macromer, said block copolymer having the structure

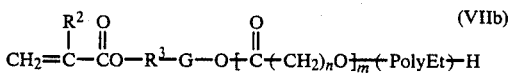  (VIIb)

wherein R$^3$ is a spacer selected from the saturated group consisting of branched or linear alkylene, haloalkylene, alkoxyl, haloalkoxyl, each (C$_1$-C$_{20}$), aralkyl, haloaralkyl, aralkoxyl and haloaralkoxyl, each (C$_7$-C$_{20}$);

m represents an integer in the range from 2 to about 300; and,

G represents the residue of a polymer of an alkylene oxide, an aliphatic glycidyl ether or an aromatic glycidyl ether having a Mn from about 200 to about 10,000;

PolyEt represents a polymer chain of from 2 to about 300 alkylene oxide units forming a polyether; and, G may be the same as PolyEt; said block copolymer having substantially uniform molecular weight distribution such that its ratio of Mw/Mn is not above about 5.0.

3. The process of claim 1 wherein said polylactone macromer is an essentially linear macromer having styrylic and OH chain ends, said macromer having the structure

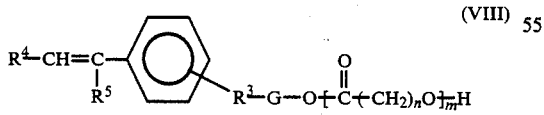  (VIII)

wherein R$^4$ and R$^5$, are selected from the group consisting of hydrogen, C$_1$-C$_{10}$ alkyl and haloalkyl, and, at least one of R$^4$ and R$^5$ is always H; and, G is the residue of a C$_2$-C$_6$ alkylene oxide or haloalkylene oxide polymer selected from the group consisting of poly(ethylene oxide), poly(propylene oxide) and poly(epichlorohydrin).

4. The process of claim 1 wherein said polylactone macromer is an an essentially linear macromer having allylic and OH chain ends, and a structure selected from

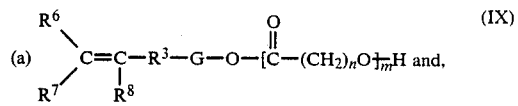  (IX)

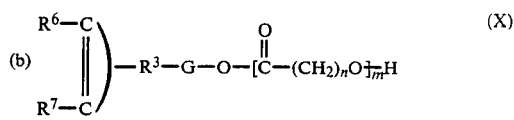  (X)

wherein G is derived from a C$_2$-C$_6$ alkylene oxide or haloalkylene oxide polymer selected from the group consisting of poly(ethylene oxide), poly(propylene oxide) and poly(epichlorohydrin); and, R$^6$, R$^7$ and R$^8$ are independently selected from the group consisting of hydrogen, C$_1$-C$_6$ alkyl and haloalkyl, and, C$_6$-C$_{10}$ aryl and aralkyl.

5. A polylactone macromer having a styrylic group at one end and a hydroxyl group at the other, formed by polymerizing
(A) a cationically ring-openable lactone having the structure

  (L)

wherein, n is an integer in the range from 4 to about 7;

R$^1$ is a group selected from hydrogen, C$_1$-C$_{20}$alkyl, cycloalkyl, alkoxy and phenyl, and the number of R$^1$ groups which are H is at least (n+2); and, (B) an ethylenically unsaturated primary or secondary alcohol selected from the group consisting of an styrylically unsaturated primary or secondary alcohol wherein the ethylenic unsaturation is adjacent an aromatic ring, represented by the structure

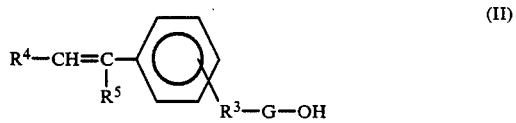  (II)

wherein,

R$^3$, if present, is selected from the group consisting of branched or linear alkylene, haloalkylene, alkoxyl, haloalkoxyl, each C$_1$-C$_{20}$, aralkylene, haloaralkylene, aralkoxyl, and haloaralkoxyl, each C$_7$-C$_{20}$;

G is a polymeric polyether spacer containing no active hydrogen, and having a number average molecular weight Mn up to about 30,000; R$^3$ and G, if either is present, is in an ortho-, meta-, or para-position of the phenyl ring which may be C$_1$-C$_6$ substituted, said position being relative to that of the olefinically unsaturated group; and, R$^4$ and R$^5$ are selected from the group consisting of hydrogen, C$_1$-C$_{10}$ alkyl and haloalkyl, and, at least one of R$^4$ and R$^5$ is always H; in the presence of an effective amount of (C) a cationic initiator selected from the group consisting of an oxonium salt and etherate of boron trifluoride; so as to produce a macromer having the structure

R—(M)$_m$—OH  (LM)

wherein R represents the residue of said alcohol having a vinyl group,

M represents the polyester repeating unit of at least one said lactone which is ring-opened, and, m represents an integer in the range from 2 to about 500.

6. A polylactone macromer having an allylic group at one end and a hydroxyl group at the other, formed by polymerizing (A) a cationically ring-openable lactone having the structure

R$^1$CH—(CR$_2^1$)$_n$—C=O  (L)
        |_____O wherein, n is an integer in the range from 4 to about 7;

R$^1$ is a group selected from hydrogen, C$_1$-C$_{20}$ alkyl, cycloalkyl, alkoxy and phenyl, and the number of R$^1$ groups which are H is at least (n+2); and, (B) an ethylenically unsaturated primary or secondary alcohol selected from the group consisting of an allylically unsaturated primary or secondary alcohol represented by the structure

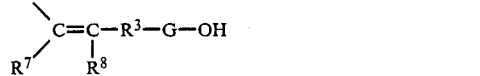

(a) R$^6$\
     C=C—R$^3$—G—OH   (III)
    /    |
   R$^7$  R$^8$ wherein only G is optionally present; or,

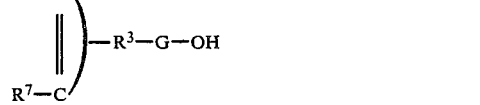

(b) R$^6$—C\
         ‖ )—R$^3$—G—OH   (IV)
    R$^7$—C/ wherein, both R$^3$ and G are optionally present;

R$^3$, if present, is selected from the group consisting of branched or linear alkylene, haloalkylene, alkoxyl, haloalkoxyl, each C$_1$-C$_{20}$, aralkylene, haloaralkylene, aralkoxyl, and haloaralkoxyl, each C$_7$-C$_{20}$;

G is a polymeric polyether spacer containing no active hydrogen, and having a number average molecular weight Mn up to about 30,000;

R$^6$, R$^7$ and R$^8$ are independently selected from the group consisting of hydrogen, C$_1$-C$_{20}$ alkyl, and, C$_6$-C$_{20}$ aryl and aralkyl; in the presence of an effective amount of (C) a cationic initiator selected from the group consisting of an oxonium salt and etherate of boron trifluoride at a temperature in the range from 0° C. to 90° C.; so as to produce a macromer having substantially uniform molecular weight distribution such that its ratio of Mw/Mn is not above 5.0, with conversion in the range from about 81% to about 95%, said macromer having the structure

R—(M)$_m$—OH  (LM)

wherein R represents the residue of said alcohol having a vinyl group,

M represents the polyester repeating unit of at least one said lactone which is ring-opened, and, m represents an integer in the range from 2 to about 500.

7. A polylactone macromer having an acryloyl group at one end and a hydroxyl group at the other, formed by polymerizing (A) a cationically ring-openable lactone having the structure

R$^1$CH—(CR$_2^1$)$_n$—C=O  (L)
        |_____O wherein, n is an integer in the range from 4 to about 7;

R$^1$ is a group selected from hydrogen, C$_1$-C$_{20}$alkyl, cycloalkyl, alkoxy and phenyl, and the number of R$^1$ groups which are H is at least (n+2); and, (B) an acryloyl alcohol selected from the group consisting of an acryloyl alcohol wherein the ethylenic unsaturation is adjacent a carbonyl group said alcohol represented by the structure

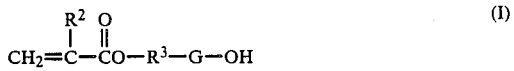

R$^2$ O
        |  ‖
CH$_2$=C—CO—R$^3$—G—OH   (I)

wherein R$^2$ is H or alkyl having from 1 to about 20 carbon atoms (C$_1$-C$_{20}$);

R$^3$, if present, is selected from the group consisting of branched or linear alkylene, haloalkylene, alkoxyl, haloalkoxyl, each C$_1$-C$_{20}$, aralkylene, haloaralkylene, aralkoxyl, and haloaralkoxyl, each C$_7$-C$_{20}$;

G is a polymeric polyether spacer containing no active hydrogen, and having a number average molecular weight Mn up to about 30,000; in the presence of an effective amount of (C) a cationic initiator selected from the group consisting of an oxonium salt and etherate of boron trifluoride;

so as to produce a macromer having the structure

R—(M)$_m$—OH  (LM)

wherein R represents the residue of said alcohol having a vinyl group,

M represents the polyester repeating unit of at least one said lactone which is ring-opened, and, m represents an integer in the range from 2 to about 500.

* * * * *